July 16, 1946.  W. B. JORDAN  2,404,294
INTEGRATOR
Filed Sept. 18, 1944

Inventor:
William B. Jordan,
by Harry E. Dunham
His Attorney.

Patented July 16, 1946

2,404,294

UNITED STATES PATENT OFFICE 2,404,294

INTEGRATOR

William B. Jordan, Scotia, N. Y., assignor to General Electric Company, a corporation of New York Application September 18, 1944, Serial No. 554,661

4 Claims. (Cl. 235—61)

This invention relates to integrators, and it has for its object the provision of an improved integrator which is positive and accurate in its operation.

More specifically, this invention contemplates the provision of a mechanical integrator which computes its integral by the trapezoidal rule; that is, it mechanically computes the desired area under a curve by sub-dividing the area into a series of trapezoids; computing the area of each trapezoid by multiplying one-half the sum of the lengths of two sides thereof by the base length; and finally by adding the calculated areas of the trapezoids together.

In accordance with this invention, there is provided an integrand input shaft and a variable of integration input shaft. Means are provided for sub-dividing the total variable of integration input to determine the interval of integration. And also means are provided for determining the product of this interval and the values of the integrand introduced by the integrand input shaft so as to determine the integral of the integrand with reference to the variable of integration.

More specifically, a first reverser is provided which is operated by the variable of integration input shaft; it periodically reverses the direction of rotation of the input thereto, and thereby sub-divides the total of the variable of integration input in order to determine the interval of integration. This interval is multiplied by the integrand values fed in by the integrand input shaft by a suitable multiplying mechanism in order to determine the areas of the various sub-divisions. The output of the multiplier is fed to an output shaft which, because of the reversals of the reversing mechanism, is driven first in one direction and then in the other, and the total motion of the shaft is imparted to a final and integral output shaft by means of a second reverser. This second reverser always operates the final shaft in one direction, until the integrand changes sign, so that the total movement of the shaft is the combined forward and backward movements of the multiplier output shaft.

Figure 2:
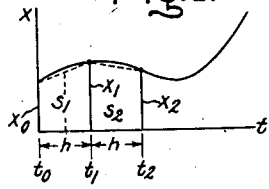
Figure 1:
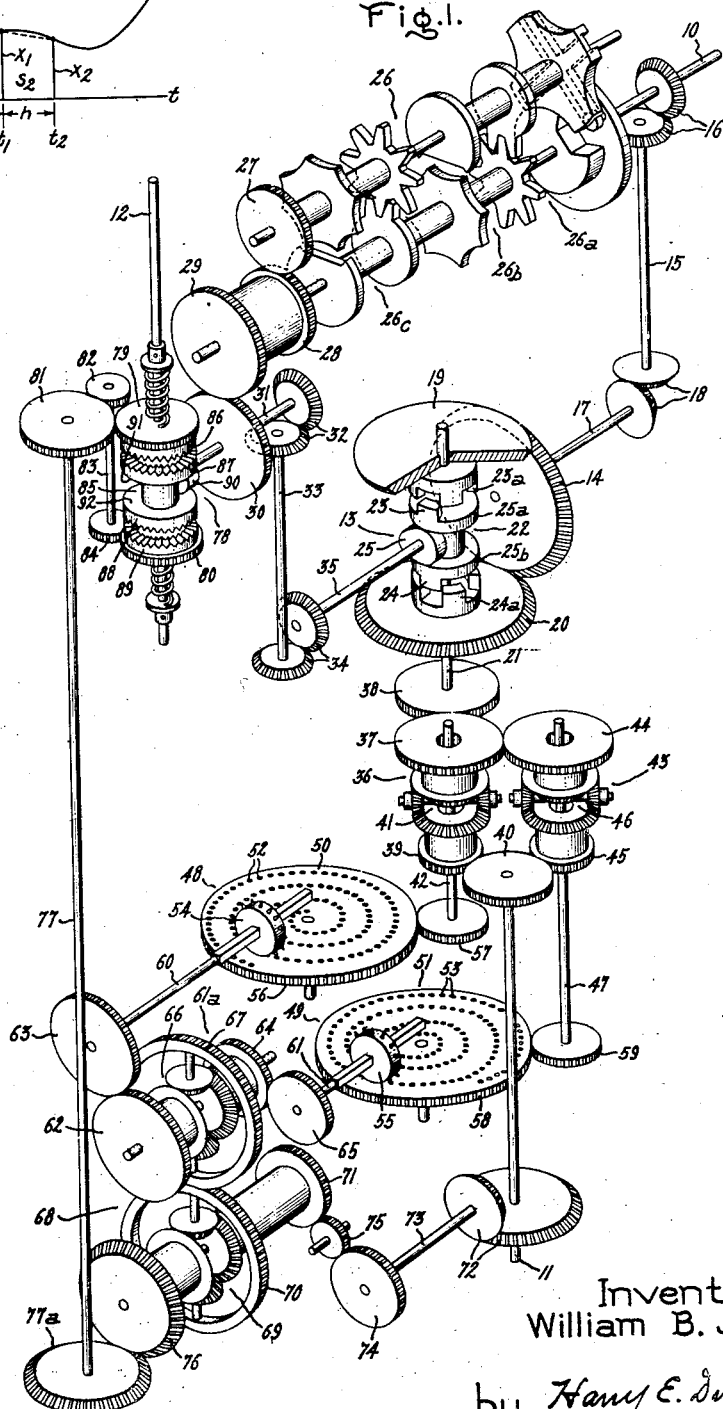

For a more complete understanding of this invention, reference should be had to the accompanying drawing in which Fig. 1 is a perspective view illustrating an integrator arranged in accordance with this invention; and Fig. 2 is a diagrammatic view illustrating the principle of operation of the mechanism.

Referring to the drawing, this invention has been shown in one form as applied to an integrator comprising a variable of integration input shaft 10, an integrand input shaft 11, and a final integral output shaft 12. The specific embodiment of the invention illustrated integrates with respect to time $(t)$ the magnitude of a variable rate of change $(x)$, which may be the rate of change of range to a target. Thus, the variable of integration $(t)$ is introduced by the shaft 10, the integrand $(x)$ is introduced by the shaft 11, while the final output of the integral shaft 12 is $(y)$, $(y)$ being related to $x$ and $t$ by the equation: $y=\int xdt$.

The shaft 10 operates a first reversing mechanism 13; as shown, the shaft 10 is geared to drive an input gear 14 of the reverser 13 by means of a shaft 15 to which the shaft 10 is geared by bevel gears 16, and by a shaft 17 to which the gear 14 is secured and which shaft is geared to shaft 15 by bevel gears 18. The gear 14 is in mesh with gears 19 and 20 which it rotates in opposite directions and which are mounted on a shaft 21 to rotate freely with reference to it. A shuttle 22, which is slidably mounted on the shaft 21 but which is arranged to rotate it, as by means of a splined connection (not shown), is arranged to be operated selectively by the two reversely rotating gears 19 and 20; for this purpose, the shuttle is provided on its opposite ends with clutch teeth 23 and 24 which are adapted to mesh with sets of teeth 23a and 24a formed on the gears 19 and 20, respectively. The shuttle is shown in its neutral position in Fig. 1, and when moved upwardly to cause its tooth 23 to engage gear tooth 23a it causes the shaft 21 to rotate in one direction, and when moved downwardly to cause its tooth 24 to mesh with the gear teeth 24a it causes the shaft 21 to rotate in the opposite direction.

The shuttle is moved to its upper and lower driving means periodically by means of a cam 25 which operates between a pair of spaced collars 25a and 25b on the shuttle. This cam 25 is periodically operated by the input shaft 10. This is accomplished through a Geneva gear train 26 having three stages 26a, 26b, and 26c. This gear train is, in effect, a revolution counter, and every time the shaft 10 turns over a predetermined number of revolutions the cam 25 is operated to move the shuttle to reverse the output of the reverser mechanism; as shown, the output of the gear 27 of the Geneva train meshes with a gear 28 which is fixed to and drives a gear 29. The gear unit 28 and 29 rotates freely on the shaft 10. The gear 29 drives a gear 30 which in turn operates the shuttle cam 25 through a shaft 31, bevel gears 32, shaft 33, bevel gears 34 and cam shaft 35.

In the specific embodiment of the invention illustrated where the input of the shaft 10 is time ($t$), the mechanism 24 operates the shuttle every ($h$) seconds, and therefore, in effect, mechanically sub-divides the total variable of integration ($t$) in order to determine the interval of integration ($h$).

The output of the reverser 13 is added to the input ($x$) of the integrand input shaft 11 in a differential 36. This differential, as shown, has an input gear 37, which is driven by gear 38 attached to the shaft 21; an input gear 39 driven by a gear 40 attached to the shaft 11; and a set of planetary gears 41 which drive the output shaft 42 of the differential, which output is the summation:

$t$(of shaft 10) $+x$(of shaft 11)

Another similar differential 43 subtracts the input ($x$) from input ($t$). This differential has an input gear 44 driven by the output gear 38 of reverser 13 through the gear 37; an input gear 45 driven by the gear 40 of input shaft 11; and a planetary gear set 46 which drives the differential output shaft 47 to measure the difference $t-x$.

The output shafts 42 and 47 of the two differentials 36 and 43 are fed into two cam mechanisms 48 and 49 respectively, which mechanisms generate quadratic functions of the inputs. The two mechanisms 48 and 49 comprise cams 50 and 51 respectively having formed therein a series of gear slots 52 and 53 arranged in spiral paths, and with which toothed gear wheels 54 and 55 mesh respectively. The cam plate 50 has a peripheral gear 56 which meshes with gear 57 driven by shaft 42 while cam 51 has a peripheral gear 58 driven by gear 59 of shaft 47.

Therefore, the summation of $t+x$ is fed into gear cam 50, while the difference $t-x$ is fed into gear cam 51.

In order to always keep positive the radii of the two spiral paths of gear slots 52 and 53, a constant ($K$) is added to each input so that the input to the cam 50 becomes $t+K+x$, while that to cam 51 becomes $t+K-x$. It will be understood that this constant ($K$) is generated by offsetting the zero position between the outputs of the differentials 36 and 43 and two cams 50 and 51 respectively.

As pointed out above, the two mechanisms 48 and 49 generate quadratic functions of their inputs; in the specific embodiment of the invention illustrated, they generate the squares of their inputs; thus, the mechanism 48 generates and its output shaft 60 measures $(t+K+x)^2$, and the mechanism 49 generates and its output shaft 61 measures $(t+K-x)^2$. These two outputs are subtracted in a differential 61a.

This differential 61a, as shown, has an input gear 62 driven by gear 63 fixed to shaft 60; an input gear 64 driven by gear 65 fixed to shaft 61, and a planetary gear system 66 having a ring gear 67, which measures the aforementioned difference $(t+K+x)^2-(t+K-x)^2$; this difference equals: $4xt+4xK$ or $4x(t+K)$.

The constant K is deleted in a differential 68 by subtracting $4Kx$ from $4x(t+K)$ so that the output of the differential 68 is the product $4xt$. As shown, the differential 68 has a planetary gear system 69 which includes a ring gear 70 which meshes with output ring gear 67 of differential 66; in other words, $4x(t+K)$ is introduced into differential 68 by ring gear 67. Differential 69 also has an input gear 71 which is driven by shaft 11 to introduce $4Kx$; as shown, it is driven from shaft 11 by bevel gears 72, shaft 73, spur gear 74 fixed to shaft 73 and an idler gear 75 meshing with the gears 71 and 74. The gear ratio between shaft 11 and gear 71 is such that the rotation of the gear 71 measures the product $4Kx$. This product is subtracted from the product $4x(t+K)$ in the differential 68 so that the differential output gear 76 measures $4xt$.

It will be observed, in view of the foregoing, that the differentials 66 and 43, the two cam mechanisms 48 and 49, and the two differentials 66 and 68 constitute a multiplier wherein the inputs thereto from the reverser 13 and the input shaft 11 are multiplied so that the output becomes the product $4xt$.

The output $4xt$ of the multiplier is fed to a shaft 77 from gear 76, which gear meshes with gear 77a fixed to the shaft 77 so that the motion of the shaft 77 measures the product $4xt$.

The shaft 77 is utilized to drive the final integral output shaft 12. Because of the action of the reverser 13 in periodically reversing, the motion of the shaft 77 is first positive and then negative. It is desirable that the final output shaft 12 always be driven in the same direction, and that it add up the total motions of the shaft 77 in its two directions; therefore, the shaft 77 drives the final output shaft 12 through a second reverser 78. This reverser comprises input gears 79 and 80 which are driven in opposite directions by the shaft 77—the gear 79 by means of gear 81 fixed to the shaft 77, and the gear 80 from the gear 81 through gear 82 fixed to a shaft 83, and a gear 84 also fixed to the shaft 83 and meshing with the gear 80. This reverser further comprises a shuttle 85 with two sets of teeth 87 and 88 which are arranged to mesh with sets of teeth 86 and 89 formed on the two input gears 79 and 80 respectively. The shuttle is splined to the shaft 12 and, therefore, when it rotates it rotates this shaft. The position of the shuttle 85 is controlled by means of a cam 90 that operates between the shuttle collars 91 and 92. The cam 90 is driven by the shaft 31 so that the reverser 78 operates to reverse periodically and simultaneously with the reversals of the reverser 13, whereby even though the output shaft 77 of the multiplier moves first in one direction and then in the other in accordance with the product $4xt$, the final output shaft 12 always moves in the same direction and measures the total motions of the shaft 77.

And this final output of the shaft 12 is $y=\int xdt$.

The theory of operation of this integrator may be better understood by reference to Fig. 2. The total area under the curve, which represents the equation $x=f(t)$, is equal to the sum of the subdivided areas of the trapezoids $S_1$, $S_2$, etc. The area of $$S_1 = \tfrac{1}{2}(x_0+x_1)h$$

that of $$S_2 = \tfrac{1}{2}(x_1+x_2)h$$

and so on.

Now at the instant of time $t_0$ the instantaneous position of the output shaft 21 of the reverser 13 is $-\tfrac{1}{2}h$ and the reverser has just thrown over to its forward position; and at the instant of time $t_1$, the instantaneous position of the output shaft 21 is $+\tfrac{1}{2}h$ and the reverser throws to its reverse position and reverses its output; the zero position of the shaft 21 corresponds to the time point exactly mid-way between $t_0$ and $t_1$ indicated by the vertical dotted line in Fig. 2.

When the shaft 21 is at position $-\frac{1}{2}h$, the $x$ input shaft 11 is at its position $x_0$, and the output shaft 77 of the multiplying mechanism is at its position $-\frac{1}{2}hx_0$.

Then at the end of one-half of an operating cycle of the mechanism, that is, at the end of the time interval $h=t_1-t_0$, the position of shaft 21 is $+\frac{1}{2}h$, that of shaft 11 is $x_1$, and that of shaft 77 is $+\frac{1}{2}hx_1$.

The net rotation of the shaft 77 at the end of the first half cycle, that is, at the end of time $t_1-t_0$, is the difference between its position at the end of the first half cycle and its position at the beginning of the first half cycle, or $$\tfrac{1}{2}hx_1-(-\tfrac{1}{2}hx_0)$$

or $$\tfrac{1}{2}(x_0+x_1)h$$

Thus, during the first half cycle, the shaft 21 moves from its initial forward position corresponding to $-\frac{1}{2}h$ to its extreme position in its forward motion corresponding to $+\frac{1}{2}h$, and as a result the movement of shaft 77 is $\frac{1}{2}(x_0+x_1)h$.

During the next half cycle the shaft 21 moves in the reverse direction, and it moves from its position $+\frac{1}{2}h$ back to its position $-\frac{1}{2}h$, and the position of input shaft $x$ changes from $x_1$ to $x_2$. The position of output shaft 77 at the start of the second half cycle is $+\frac{1}{2}hx_1$ and at the end thereof is $-\frac{1}{2}hx_2$, and the net change in the position of the shaft 77 during the second half cycle is:

$$-\tfrac{1}{2}hx_2-\tfrac{1}{2}hx_1$$

or $$-\tfrac{1}{2}h(x_1+x_2)$$

During all of this time, the final output shaft 12 is operated by the shaft 77 through the reverser 78, this reverser always functioning to add the total forward and backward movements of the shaft 77 and imparting the sum to the shaft 12. Therefore, during the first half cycle when the reverser 13 is in its forward motion, the change in position of shaft 12 is the same as that of shaft 77, that is, it is equal to $\frac{1}{2}(x_0+x_1)h$; however, the change in position of the final shaft 12 during the second half cycle—when the reverser 78 has reversed its operation—is the negative of the change in position of the shaft 77 during the second half cycle, that is, it is the negative of $-\frac{1}{2}h(x_1+x_2)$, which, of course, is $+\frac{1}{2}h(x_1+x_2)$.

Therefore, the total change in the position of the final output shaft 12 from time $t_0$ to time $t_2$ is $$\tfrac{1}{2}h(x_0+x_1)+\tfrac{1}{2}h(x_1+x_2)$$

which is $$S_1+S_2$$

Immediately upon the completion of the first cycle, both reversers 13 and 78 operate to reverse and the complete cycle is repeated. And in this way the mechanism adds up the areas of all of the trapezoids under the curve. In other words, the total motion of the final output shaft 12 measures the areas of all the trapezoids under the curve, and consequently measures the desired integral.

It will be understood that this integrator will operate to calculate the integral of $x$ regardless of whether $x$ is positive or negative.

The description of this integrator and of its operation given above show how integrals may be calculated by this integrator using the trapezoidal rule. It is also possible, however, to use it for computing integrals by Simpson's one-third rule or by other well-known mechanical quadrature formulas by an adjustment of the zero position of the multiplier. For example, if the shaft 21 is at position $-\frac{1}{3}h$ when the $x$ input shaft 11 is at its position $x_0$, and the reversers 13 and 78 have just thrown to their forward driving positions at this instant, then the integrator will calculate the integral $\int x\,dt$ based on Simpson's one-third rule.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. An integrator comprising variable of integration input means, integrand input means, reversing mechanism operable in accordance with the operation of said variable of integration input means for periodically reversing the direction of the input, means for multiplying the output of said reversing mechanism by the input of said integrand input means, and means for periodically reversing the direction of the output of said multiplying means simultaneously with the reversals of said first reversing mechanism.

2. An integrator comprising a variable of integration input shaft, a reversing mechanism operated by said input shaft constructed and arranged to reverse periodically the direction of rotation of its output with reference to the input thereto, an integrand input shaft, a multiplier operated by the output of said reversing mechanism and the input of said integrand input shaft operating to multiply said output and input together, a final integral output shaft, and a second reversing mechanism operating said final output shaft and controlled to reverse periodically and simultaneously with said first reverser so as to periodically reverse the output of said multiplier to impart its motions to said final output shaft.

3. An integrator comprising a variable of integration input shaft, an integrand input shaft, an integral output shaft, a first reverser having an output shaft, said reverser being operated by said variable of integration input shaft so that said output shaft is periodically reversed with reference to said variable of integration input shaft, the output shaft thereby measuring the interval of integration, first mechanism for adding the output of said output shaft with the input of said integrand input shaft and for squaring said summation, second mechanism for subtracting from the output of said output shaft from the input of said integrand input shaft and for squaring the difference, means for subtracting the output of said second mechanism from that of said first mechanism so as to obtain the product of the variable of integration input and the integrand input, an output shaft driven first in one direction and then in the other by the output of said last-named means, and a second reverser for operating said integral output shaft operated by said variable of integration input shaft to reverse periodically and simultaneously with said first reverser so that the total motion of said last-named output shaft in both directions is combined as a motion in said final integral output shaft.

4. An integrator comprising a variable of integration input shaft, an integrand input shaft, an integral output shaft, a first reverser having an output shaft, said reverser being operated by said variable of integration input shaft so that said output shaft is periodically reversed with reference to said variable of integration input shaft, the output shaft thereby measuring the interval of integration, a differential having an input driven by said output shaft of said reverser, a second differential having an input driven by said output shaft of said reverser, said two differentials also having inputs operated by said integrand input shaft, and the two differentials also having output shafts, the first differential however generating and delivering to its output shaft the summation of the reverser output and the input of said integrand shaft, while the second generates and delivers to its output shaft the difference between the output of said reverser and the input of said integrand shaft, a first cam mechanism operated by the output of said first differential for generating the square of said summation, a second cam mechanism operated by the output of said second differential for generating the square of said difference, a third differential operated by said two cam mechanisms having an output which generates the difference between the outputs of said first and second cam mechanisms to thereby generate the product of the integrand input and the variable of integration input, a shaft driven by the output of said third differential, a second reverser controlled by the operation of said variable of integration input shaft so as to reverse periodically and simultaneously with the reversals of said first reverser, and a driving connection between said second reverser and said integral output shaft so that said shaft moves through the total distance that said last-named shaft is driven by said third differential.

WILLIAM B. JORDAN.